United States Patent [19]
Dowd et al.

[11] Patent Number: 6,141,755
[45] Date of Patent: Oct. 31, 2000

[54] FIREWALL SECURITY APPARATUS FOR HIGH-SPEED CIRCUIT SWITCHED NETWORKS

[75] Inventors: Patrick William Dowd, Columbia; John Thomas Mchenry, Odenton, both of Md.

[73] Assignee: The United States of America as represented by the Director of the National Security Agency, Washington, D.C.

[21] Appl. No.: 09/059,041

[22] Filed: Apr. 13, 1998

[51] Int. Cl.⁷ ....................................................... G06F 11/00
[52] U.S. Cl. ............................................. 713/200; 713/201
[58] Field of Search ..................................... 713/200, 201, 713/202; 707/7, 9, 10; 380/4, 25, 23; 364/286.4, 286.5, 286.6; 340/825.34, 825.31; 395/200.31, 200.55, 200.68

[56] References Cited

U.S. PATENT DOCUMENTS

| | | | |
|---|---|---|---|
| 4,860,352 | 8/1989 | Laurance et al. | 380/23 |
| 5,313,579 | 5/1994 | Chao . | |
| 5,550,984 | 8/1996 | Gleb . | |
| 5,606,668 | 2/1997 | Shwed . | |
| 5,623,601 | 4/1997 | Vu | 395/187.01 |
| 5,633,933 | 5/1997 | Aziz . | |
| 5,699,513 | 12/1997 | Feigen et al. | 395/187.01 |
| 5,778,174 | 7/1998 | Cain | 395/187.01 |
| 5,793,964 | 8/1998 | Rogers et al. | 395/200.32 |
| 5,825,891 | 10/1998 | Levesque et al. | 380/49 |
| 5,835,726 | 11/1998 | Shwed et al. | 395/200.59 |
| 5,864,666 | 1/1999 | Shrader | 395/187.01 |
| 5,898,784 | 4/1999 | Kirby et al. | 380/49 |
| 5,898,830 | 4/1999 | Wesinger, Jr. et al. | 395/187.01 |
| 5,909,493 | 6/1999 | Motoyama | 380/25 |
| 5,968,176 | 10/1999 | Nessett et al. | 395/187.01 |
| 5,987,611 | 11/1999 | Freund | 713/201 |

*Primary Examiner*—Robert W. Beausoliel, Jr.
*Assistant Examiner*—Nadeem Iqbal
*Attorney, Agent, or Firm*—Stephen M. Bloor

[57] ABSTRACT

A network firewall security apparatus that enables a very high degree of traffic selectability yet avoids the usual performance penalty associated with firewalls. This approach is specific to high-speed circuit switched networks, Asynchronous Transfer Mode (ATM) networks in particular. Security management is achieved through active connection management with authentication, better suited to the cell-based environment of high-speed circuit switched networks and to the mix of circuit switched traffic, where Internet Protocol (IP) datagrams comprise a fraction of the total traffic. The information in the signaling cells is used to determine which flows, rather than which individual cells, are allowed to pass through the firewall. A hierarchical method has been devised, in which the physical location of the interrelated components may be decoupled. Active connection management is applied in determining the approval of a connection based on signaling information and network state information. Once a flow has been validated, the cells associated with that flow are allowed to proceed through the firewall at line-speed with limited intervention and no performance degradation.

16 Claims, 3 Drawing Sheets

FIREWALL SECURITY APPARATUS FOR HIGH-SPEED CIRCUIT SWITCHED NETWORKS

FIELD OF THE INVENTION

The present invention, a firewall security apparatus for high-speed circuit switched networks, relates to information processing system organization, and more particularly, to the security of computer networks using active connection management with authentication.

BACKGROUND OF THE INVENTION

Network security is an item of great concern, one that could potentially stall the wide scale deployment of circuit switched networks in the public-private arena The present invention concerns a new apparatus for establishing network security that provides a strong degree of flow selectability without negatively impacting the performance advantages of high speed circuit switched networks.

One of the strengths of our invention is that it achieves a significant degree of security, yet does so with a low cost and complexity. An additional strength of the invention is that security can be provided for widely varying network transmission rates, from low speed narrowband ISDN operating in the range of kilobits per second to high speed broadband networks operating above gigabits per second. The flexibility is maintained while still preserving the relative low cost and complexity advantages. This is important since circuit switched networks may soon be widely deployed. This is particularly true in lower speed environments, such as residential broadband networks (RBB), where low cost is essential. RBB deployment will include not only the typical users of high-speed circuit switched networking services but will also include deployment to the home and small business. It does not matter if this "last-mile" deployment is via optical fiber, coax cable, or twisted-pair copper wire or if the service is provided by traditional telecommunications companies, cable companies, or independent service providers. The present invention can provide firewall security in all such deployments.

The terms "cell," "Protocol Data Unit (PDU)," "datagram," "frame," and "packet" are used to denote objects transmitted through the network. The context of connection-oriented or connectionless communications is implied through the terms used. The terms "packet-switched" and "circuit-switched" are used with connectionless and connection-oriented communication, respectively. "PDU" is a generic term, used for both connectionless and connection-oriented communication, which denotes an object of transfer specific to a layer of the protocol stack. Connectionless communication, such as found in the Internet Protocol (IP), provides best effort delivery of datagrams or packets. Unless otherwise noted, the terms "datagram" and "packet" are used to denote IP type of packets (network layer PDUs) that contain transport layer PDUs, such as a TCP or UDP encapsulated data segment, in their payload. The size of objects transmitted on the physical layer is limited to the Maximum Transmission Unit (MTU). The term "frame" is used to denote a link level PDUs in connection-oriented communication. The term "cell" is used to denote the segmentation of a connection-oriented link layer PDU frame into a fixed size limited by the MTU of the physical layer PDU. For example, in the Asynchronous Transfer Mode (ATM) protocol, the cell size is 53 bytes. A "flow" is a communication session between two network endpoints that can be used for the transfer of PDUs. A flow in the context of packet switching networks would be a series of related packets moving between two endpoints but in a connectionless fashion.

As an example, in a connectionless environment IP (a layer three protocol) packets are encapsulated by LLC/SNAP (a layer two protocol) for transmission across Ethernet that limits the link layer PDU to approximately 1500 bytes. IP is responsible for partitioning the data into a size suitable to the lower layers.

Note that a connection-oriented network, such as ATM, can be used to provide pathways between network elements such as endpoints and IP routers. ATM establishes layer two connectivity and allows connectionless layer three traffic such as IP.

Traditional firewalls examine every single datagram contained in a datastream. This places a heavy burden on the firewall and creates a potential bottleneck in performance. While this workload may be acceptable for lower speed packet-switched networks, it is not appropriate for higher speed circuit switched networks that are carrying an increasing share of network traffic. The cost and complexity of such systems would be prohibitive. The present invention uses an alternative firewall security method where the flow, rather than an individual packet, is validated. The primary advantage of the present invention is that it determines the suitability of flows in real-time during the initial connection negotiations. Once the suitability of a connection is established, datagrams associated with that flow are allowed to proceed through the firewall with no performance degradation. In order to understand the functionality of the firewall security apparatus for high-speed circuit switched networks (firewall), it is first necessary to briefly review circuit switched network communication and general firewall security. This discussion of circuit switched network communication focuses on aspects of the protocol components and traffic trends that pertain to the firewall implementation. The present invention provides firewall security for any circuit switched network that is signaling based and works with a multitude of hardware and software protocols. Current examples of circuit switched network protocols are Asynchronous Transfer Mode (ATM) and Frame Relay. So as to explain the present invention in pragmatic terms using the current vocabulary of the art, we provide much of the background discussion using ATM as an exemplar circuit switched network protocol.

ATM is a cell based communication protocol in which all of the data transmitted in the network are broken up into 53-byte cells. Each cell contains a 5-byte header and forty-eight bytes of payload. The source and destination of a cell are not identified in its header. Instead, the cell headers contain an identifier whose context is only defined along a single link, not end-to-end between source and destination. The cell header contains a 12-bit virtual path indicator (VPI) and a 16-bit virtual channel indicator (VCI) that assign the cell to a specific virtual data flow along a physical link between two switches. The source and destination are only identified within the body of the initial signaling messages used to create the connection. The signaling protocol defines the edge level identifiers (VCI and VPI) at each hop along the way.

ATM is circuit switched; a circuit or path must be formed between the source and the destination before any data can be transmitted. This path is formed by initiating signaling messages that pass between switches on specific VPI, VCI pairs that are reserved solely for signaling. The payload of these cells contains information about the network service access points (NAPS), the network endpoint identifiers, for the source and destination of the connection that is requested. This information allows the switches to identify an appropriate route. The signaling channel and other channels known a priori are also used to pass status and state information between the switches.

Once the connection has been established, a cell launched from a source is transported to its destination through intermediate ATM switches via hardware routing. The connection setup process sets up the route mapping, assigning an input port, input VPI, and input VCI to a respective output port, output VPI, and output VCI at each intermediate ATM switch.

Software based cell routing is not performed at intermediate ATM switches since the route has already been constructed. This allows for fast switching, since the examination and routing is performed in hardware, but it makes it difficult to identify the source and destination of the traffic. Note that a different VPI/VCI pair is observed between the source and destination along each link. Although the same VPI/VCI pair is typically used for each direction of a bi-directional flow along a given link, this is not required.

One significant advantage of the invention is that it has decoupled the functional process of cell examination from flow approval and has devised a hierarchical structure to support the interface between the two functions. This is the key to how high-speed security can be supported at such a low cost with a significant reduction in system complexity.

SUMMARY OF THE INVENTION

In consideration of the problems detailed above and the discrepancies enumerated in the partial solutions thereto, an object of the present invention is to provide firewall protection for a circuit switched network environment.

Another object of the present invention is to provide firewall protection for a circuit switched network environment that is simple to implement.

Another object of the present invention is to provide low-cost firewall protection for a circuit switched network environment.

Another object of the present invention is to provide a firewall mechanism that can operate on high-speed data streams in real-time without degrading the performance of the network.

In order to attain the objectives described above, according to an aspect of the present invention, there is provided a firewall security apparatus for high-speed circuit switched networks.

Our invention implements a method for performing high-speed circuit-switched firewalling that is suitable for low-cost implementations. This firewall is inserted at the edge of a private network on a link that connects this network with the outside (potentially hostile) world. The firewall functions are implemented in a hierarchical fashion and are divided into two components, a Firewall Control Process and a Firewall Inline Process. As will be explained in the following discussion, the Firewall Control Process and the Firewall Inline Process are implemented in the firewall control processor and the firewall inline processor, respectively. The Firewall Control Process performs firewall computations and database functions. It supports access control mechanisms used to determine if a connection should be allowed between the outside network and the protected enclave. The Firewall Inline Process performs bit-level processing and routing tasks on high-speed data streams at real-time rates. These tasks are used to allow, discard, or monitor data flows that are attempting to pass through the network boundary. The key to this implementation is that once a flow is approved, all of the cells associated with that flow pass through the Firewall Inline Process without incurring a performance penalty and without placing any processing burden on the Firewall Control Process.

This invention uses a scheme called active connection management to implement flow approval. Active connection management examines the signaling traffic flowing across the firewall boundary. This is a change from the way firewall access has been granted in traditional packet switched firewalls. Active connection management determines the source and destination of the connection through examination of signaling and routing messages. This active connection management uses various techniques to implement flow approval, including participant verification, route validation, and endpoint authentication. The participant verification process identifies the source and destination of a requested connection by examining the endpoint identifiers that are contained within the signaling message that set up the connection. The route authentication process examines the path used to set up the connection and determines if this path is consistent with the participants associated with the connection. The endpoint authentication process verifies the authenticity of the participants identified for the connection.

The firewall splits the network into two regions; one region between the firewall and network nodes within the protected enclave and the other between the firewall and outside nodes that comprise the external network. This bifurcation of the network into regions, on either side of the firewall, allows for separate authentication processes and allows such authentication processes to proceed in parallel in the two authentication regions if desired. This flexible solution is well suited to the dynamic nature of future computing systems, including mobile commuting, where different communication constraints may be faced by the portions of the network at the opposite sides of the firewall. Of course, this split of the network into regions is not limited to two regions. The firewall may provide separate authentication processes for any number of classes of users or individual users on either side of the firewall.

In packet switched firewall systems, users are often able to modify the security posture configuration of their machine. Even when security procedures are applied in a consistent manner, they are sometimes disabled and circumvented when the firewall protection impacts performance. This problem becomes increasingly difficult when numerous low-end machines are connected to a local network. In some embodiments, this problem may be solved by moving the authentication procedure to the firewall. This enables the network administration to enforce a consistent level of security within the enclave.

Our invention, the circuit switched firewall, uses a different approach to the firewall problem than packet switched firewalls. Our implementation uses the information in the signaling datagrams to determine which flows, rather than which individual datagrams, are allowed to pass through the firewall. Once a flow has been validated, the PDUs associated with that flow are allowed to proceed through our firewall at line-speed with no intervention, other than the comparison of the link level identifiers with a list of approved flows, and therefore causes no performance degradation. In addition to the performance implication, this limited intervention is important because many flows are sensitive to variations in the interdelay times between arriving packets or cells introduced by firewall processing. This variation in interdelay times is often called jitter. Traditional firewalls introduce delay since they must process all packets that pass. Due to queuing delays, the delays between the packets vary. When the delay varies too much, the information received is degraded. With voice traffic, jitter causes channel quality to degrade. Our firewall provides for improved access control and therefore is better suited to preserve the inter-PDU timing and avoid excessive jitter.

It should be well appreciated by those skilled in the art that the foregoing discussion of circuit switched communications protocols can be easily generalized to any circuit switched network communications. Particular ATM uses of the current invention are discussed in detail in *An FPGA-Based Coprocessor for ATM Firewalls,* PROCEEDINGS: THE 5TH ANNUAL IEEE SYMPOSIUM OF FIELD-PROGRAMMABLE CUSTOM COMPUTING MACHINES, Apr. 16–18, 1997 at 30, which is hereby incorporated by reference.

Additionally, the techniques and embodiments described above allow for parallel processing of the decisions associated with the normal operation of the firewall. For example, the flow is allowed to proceed through the firewall as the signaling is passed to the controller to make a decision. This technique can be implemented in a number of different ways as seen in the following discussions.

Our invention may best be summarized as an apparatus for high-speed circuit switched networks deployed between an external circuit switched network and an internal circuit switched network for preventing unauthorized communications between the external and internal circuit switched networks while permitting authorized communications between them. The firewall has both an external and an internal network transceiver for communicating with, and transforming from, the physical line characteristics of the external and internal circuit switched networks, respectively. A flow switch controls communications between the internal and external circuit switched networks, allowing authorized communications when closed. A firewall controller uses active connection management to determine under what circumstances a flow, rather than an individual packet, is allowed through the firewall.

BRIEF DESCRIPTION OF THE DRAWINGS

Our invention may best be understood when reading the following specification with reference to the accompanying drawings, which are incorporated in and form a part of the specification, illustrate several embodiments of the present invention, and together with the description, serve to explain the principles of the invention. In the drawings.

DETAILED DESCRIPTION OF THE PREFERRED EMBODIMENTS

Figure 1:
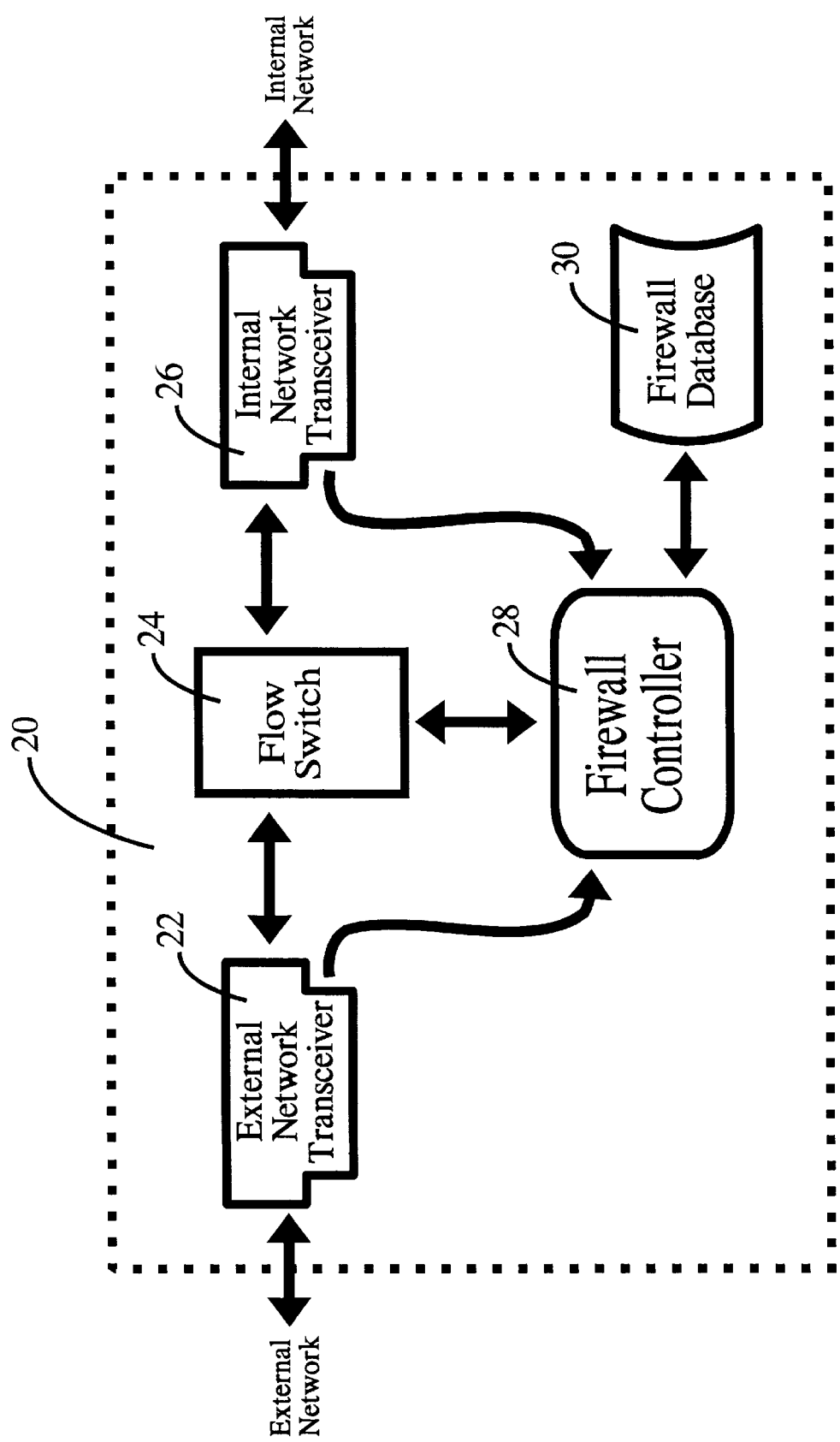
FIG. 1 is a schematic drawing of a firewall security apparatus for high-speed circuit switch networks (firewall) according to a preferred embodiment of the present invention.

Our invention, a firewall security apparatus for high-speed circuit switched networks 20, herein referred to as the firewall 20, is configured between an external circuit switched network and an internal protected circuit switched network, as shown in FIG. 1. The firewall 20 is connected to the external circuit switched network through an external network transceiver 22. The external network transceiver 22 receives incoming PDUs from the external circuit switched network, transforms the physical line characteristics of the PDU on the external network media to a digital bit stream, and passes the digital bit stream PDUs in parallel to the flow switch 24 and firewall controller 28. In an analogous manner, the internal network transceiver 26 connects the firewall 20 to the internal protected circuit switched network and receives incoming PDUs from the internal circuit switched network, transforms the physical line characteristics of the PDU on the internal network media to a digital bit stream, and passes the digital bit stream PDUs in parallel to the flow switch 24 and firewall controller 28. Additionally, the external network transceiver 22 receives digital bitstream PDUs from the flow switch 24 and transforms them to the physical media format required of the external circuit switched network and the internal network transceiver 26 receives digital bit stream PDUs from the flow switch 24 and transforms them to the physical media format required of the internal circuit switched network.

The flow switch 24 is a memory buffer used to store digital bit stream PDUs received from either the external network transceiver 22 or the internal network transceiver 26 while the firewall controller 28 validates the digital bit stream PDU as being part of an approved data flow. On command from the firewall controller 28 the flow switch 24 forwards digital bit stream PDUs received from the external network transceiver 22 to the internal network transceiver 26 or the digital bit stream PDUs received from the internal network transceiver 26 to the external network transceiver 22.

The firewall controller 28 determines whether each of the digital bitstream PDUs is data, control information, or a signaling message. If the digital bit stream PDU is determined to be control information or a signaling message, it is retained within the firewall controller 28 for further processing. If the digital bit stream PDU is determined to be data, the firewall controller 28 instructs the flow switch 24 to pass the digital bit stream PDU through the firewall if the link level identifier of the digital bit stream PDU is registered as approved in the firewall database 30. If the link level identifier has only been conditionally approved, the firewall controller 28 stores a copy of the digital bit stream PDU in memory in addition to instructing the flow switch 24 to pass it through the network. The firewall controller 28, when interpreting the signaling messages, can determine that a flow is acceptable, non-acceptable, or conditionally approved. Conditional approval is an innovation of the invention in that it allows potentially suspect communication to take place but allows the flow to be monitored and logged by the firewall controller database 30. If the link level identifier is from a flow that is not registered in the firewall database 30, the firewall controller 28 instructs the flow switch 24 not to pass the digital bit stream PDU through the firewall 20.

The firewall controller 28 determines whether an arriving digital bit stream PDU is data, control information, or a signaling message by comparing the link level information associated with the arriving digital bit stream PDU to an entry in the firewall database 30.

If the digital bit stream PDU is control information, then the firewall controller 28 instructs the flow switch 24 to pass the digital bit stream PDU through the firewall 20. In some alternate embodiments of the firewall 20, the control information may also be sent to a network log file stored in the firewall database 30 and be retained within the firewall controller 28 for further processing.

Signaling messages instruct the network to create or delete virtual circuits in the network. When the firewall controller 28 receives a signaling message, which will be reassembled from multiple cells in ATM, it instructs the flow switch 24 to pass the signaling message through the firewall 20 and in parallel performs active connection management on the requested connection. When a signaling message that requests deletion of a virtual circuit is received by the firewall controller 28, the firewall controller 28 determines if the data flow is registered in the firewall database 30 of approved or disapproved connections. If it is, the firewall controller 28 removes the entry associated with that circuit from the firewall database 30. If the entry is not already in the firewall database 30, no further action is to taken.

A priori knowledge about the link level identifier associated with each link level PDU determines whether the PDU is part of a signaling message, control information, or a data PDU. This a priori knowledge is contained in the firewall database 30. The firewall database 30 may contain three major lists: (a) a list of the a priori knowledge that identifies a link level identifier with the type of message contained in the link level PDU, (b) a list of network endpoint identifiers that are approved or disapproved for communication, and (c) a list of all approved link level identifiers. The uses of these lists are explained below.

Active connection management takes place in multiple steps. The behavior of the firewall 20 is described in terms of received PDUs arriving from the external network with the intention of being passed to the inside network as shown in FIG. 1. Note that analogous flows in the reverse direction will also take place. The firewall controller 28 compares the link level information associated with each arriving PDU against its a priori knowledge configuration information (list (a), above) contained in the firewall database 30 and determines the type of the received PDU to be data, control, or signaling.

If the link layer PDU is deemed to be data, the firewall database 30 (list (c), above) is interrogated to determine if the link level identifier of the PDU has been approved. If the flow has been approved, the firewall controller 28 instructs the flow switch 24 to allow the PDU to proceed and the PDU is passed from the flow switch 24 to the internal network transceiver 26 (or the external network transceiver 22 for a reverse flow). If the flow has been disapproved, either by its link level identifier not being resident in the approved flow list of the firewall database 30 or if the link level identifier is matched with an entry in a disapproved flow list of the firewall database 30, the firewall controller 28 instructs the flow switch 24 to delete the PDU and not allow it to proceed. If the flow has been conditionally approved, the firewall controller 28 instructs the flow switch 24 to allow the PDU to proceed and the PDU is passed from the flow switch 24 to the internal network transceiver 26 (or the external network transceiver 22 for a reverse flow). For the conditionally approved case, the PDU is also retained within the firewall controller 28 and logged in the firewall database 30 for further in-depth examination.

If the link layer PDU is deemed to be part of a control message, such as containing a network routing message, the link level PDU is conditionally approved: the firewall controller 28 instructs the flow switch 24 to allow the PDU to proceed and the PDU is passed from the flow switch 24 to the internal network transceiver 26 (or the external network transceiver for a reverse flow), and the link level PDU is also held by the firewall controller for further analysis. Control information receives extensive analysis by the firewall controller 28 in parallel with the transmission of the PDU. The control message is examined and state information regarding the network is examined and recorded in the firewall database 30. Information that can be obtained from control information allows the firewall database to understand the configuration of the external and internal network. Control information such as operations and maintenance messages are also examined for useful state information regarding the state, health, and degree of congestion of the network. Lastly, the control information may be examined for hidden functionality such as covert channels.

If the link level PDU is deemed to be signaling information, it is passed to the firewall controller 28 where the network level PDU is reassembled and examined from a number of link level PDUs. A complete signaling message is contained in the payload of multiple link level PDUs. The firewall controller 28 extracts the message and a multiple step process of participant verification is performed. If any of the steps fail, according to the desires of the firewall administration, the new flow that the signaling message is trying to create may either be disapproved or conditionally approved. A connection is achieved through the three step connection request process of ATM where there are 3 major types of messages: SETUP, CONNECT, CONNECT ACK, and a two step disconnect process with 2 messages: DISCONNECT and DISCONNECT ACK.

Consider first the case of a connection request message. The network endpoint identifiers and the associated link level identifiers used for that flow across that specific link are located within the body of a connection request messages. The first step is to determine if the network endpoint identifiers reside within the firewall database 30 list (list (b), above) of approved or disapproved network endpoint identifiers. If the network endpoint identifiers do reside within the firewall database 30 list of approved network endpoint identifiers, the link level identifiers associated with the network endpoint identifiers may be entered into the firewall database 30 list of approved link level identifiers if the remaining steps of the evaluation process are successful.

The next step in the evaluation process is route verification. There have been network attacks where IP datagrams from outside a private enclave arrive at the boundary of the private enclave with the same source addresses as a node inside the enclave. Our invention detects this problem during the connection setup process by ensuring that the endpoint identifiers and the messages themselves originate from outside the enclave. In addition, route authentication ensures that not only are the source and destination endpoint identifiers located on opposite sides of the firewall, but that the path of the signaling message is reasonable for the claimed location. Within the connection request messages are typically a hierarchically complete path list of the network elements traversed from the originating network endpoint and its ingress network element. For example, with PNNI, the routing protocol typically used with ATM, this list is called the designated transit list. The list is needed for fault recovery and crankback purposes. The firewall controller 28 examines this path list and compares it to the network topology created by the examination of control messages and logged messages in the firewall database 30. The firewall controller 28 determines if the path is reasonable. If the path is acceptable, the connection may be approved if the remaining steps of the evaluation process are successful. If the path is questionable, the firewall controller 28 may either disallow the connection or conditionally allow it to proceed.

The next step of the evaluation process is the resource allocation step. In this case, the level of network resources requested by the connection request messages is examined. For example, ATM supports a concept of quality of service where a connection can specify exactly the resources it needs, such as maximum and average data rate, and other parameters such as inter-cell delay characteristics. The firewall controller 28 can examine the requested resources and determine if the request is reasonable. For example, a connection could request a very high data-rate and essentially block other connections from being granted. Alternatively, the firewall controller 28 can detect if multiple connections originating from the same network endpoints are also attempting to monopolize the network resource. If the resource level requested is deemed reasonable, the connection may be approved if the other remaining steps of the evaluation process are successful.

The final step of the evaluation process is endpoint authentication. It may take place in parallel so as to not excessively delay the connection creation process or may be eliminated all together depending on the security model. This requires each endpoint of the connection to authenticate itself with the firewall. The firewall performs a proxy authentication with the external endpoint in place of the internal endpoint. Essentially, the firewall possesses the public and private keys of the internal endpoint and ensures that the authentication process is performed, enabling a consistent security model across all internal nodes. Additional details of endpoint authentication are provided below.

Consider the case of a disconnect request message. The link level identifiers of the flow to be disconnected are determined and removed from the list of approved link level identifiers maintained by the firewall database 30.

Although the messages are different, the same process can be applied to creating, joining, and dropping out of multicast connections in addition to typical unidirectional and bi-directional connections between two endpoints described above.

The details of endpoint authentication can be consider by examining the case of an endpoint inside the protected enclave, denoted as node A, originating a flow to a node outside the enclave, denoted as node B. Our firewall acts as a security agent providing two regions of authentication for the system. When the firewall first receives the SETUP message from A, it sets up a flow between itself and node B and begins an authentication procedure. The CONNECT is held back from node A by the firewall while the firewall authenticates itself with node B via in-band signaling on the (VPI, VCI) pair flow of the data channel. The firewall acts as an entity that enforces a set of rules for someone else, a proxy, for node A since it has access to all of the public and private keys of the nodes within the protected enclave. Once the firewall has satisfied itself as to the integrity of node B, it then authenticates itself with the originating endpoint, acting as a proxy for the destination endpoint. The firewall allows the connection to complete with node A only after the successful completion of this procedure. In some embodiments, to add more flexibility to the security policy, the authentication between node A and the firewall is optional. This allows node A to communicate to any other node within the enclave in any manner it prefers, but communication that crosses the enclave boundaries must conform to the firewall's security posture or the communication is not allowed to pass. There are several features of this authentication mechanism that are worthy of mention. First, a public key based authentication scheme may be used, but the specific algorithm is not important to the overall idea. It also should be noted that the firewall has already approved communication between nodes A and B is permissible before the authentication process is initiated.

In most embodiments of the firewall 20 used on high-speed circuit switch networks, it is desirable to use custom designed high speed components for those components of the firewall 20 that need to operate at network line-speed. This minimizes firewall 20 performance degradation. The components that need to operate at line speed are those in series between the external and internal protected networks and those portions of the firewall controller 28 and firewall database 30 that support them. Other functions of the firewall controller 28 and firewall database 30 need not operate at network line speed.

While the Firewall Inline Process and Firewall Control Process, described above, may be implemented on a single hardware entity, as described in the embodiment above, they may be implemented on separate hardware as described below. As shown in the hierarchical firewall 40 in FIG. 2, those components that need to operate at line speed, the external network transceiver 22, flow switch 24, and internal network transceiver 26, as well as the firewall inline processor (FIP) controller 46 and flow status indicator (FSI) memory 48, needed to support those functions of the firewall controller 28 and firewall database 30, respectively, that also need to operate at line-speed can be grouped together forming the FIP 42 portion of the hierarchical firewall 40, which implements the Firewall Inline Process described above. The functionality of the firewall controller 28 in FIG. 1 is partitioned into the FIP controller 46 and the firewall control processor (FCP) controller 50 of FIG. 2. The firewall controller 28 and firewall database 30 functions of the firewall 20 are not required to operate at line-speed. They can be supported on a FCP controller 50 and full network database 52, respectively. This non-line-speed portion of the hierarchical firewall 40 is known as the firewall control processor (FCP) 44 and implements the Firewall Control Process described above.

In the hierarchical firewall 40 embodiment, the firewall controller 28 and firewall database 30 of the firewall 20 are replaced by the FIP controller 46 and FSI table 48. The external network transceiver 22 and internal network transceiver 24 pass the digital bit stream PDUs in parallel to the FIP controller 46 with the flow switch 24 in an analogous manner to the way they passed the same data to the firewall controller 28 in the firewall 20 of FIG. 1 and, similarly the FIP controller 46 commands the flow switch to forward digital bit stream PDUs received from the external network transceiver 22 to the internal network transceiver 26 or vice versa when the flow has been validated. The FIP controller 46 further communicates with the FSI table 48, where current link level identifiers for approved flows passing the hierarchical firewall 40 are listed, and the FCP controller 50 to receive and transmit control information.

The operation of the hierarchical firewall 40 is as described in preceding paragraphs, but the functionality is partitioned. Generally, the Firewall Inline Process is implemented in hardware on the FIP 42 and the Firewall Control Process is implemented on the FCP 44. This is the key to obtaining high performance at a low cost. The FIP controller 46 now only examines the link level identifier of all received PDUs and passes to the FCP controller 50 all PDUs deemed to be signaling, control or conditionally approved flows. The list of approved link level identifiers associated with the firewall database 30 is maintained in the FSI table 48. The full network database 52 maintains the other lists associated with the firewall database 30. The FIP controller 46 instructs the flow switch 24 to allow the received PDU to proceed to its egress network transceiver (the external network transceiver 22 for outbound flows or the internal network transceiver 26 for inbound flows) if the link level identifier of the PDU was listed in the list of approved link level identifiers within the FSI table 48 as either approved or conditional. If the PDU was deemed conditional by the FIP controller, the PDU is also passed to the FCP controller 50 for further processing.

Structuring the functionality in a hierarchical fashion allows a specific low cost hardware device, the FIP controller 46, to perform the operations that are of low complexity but require high speed response. The functions that require more complex processing but with an eased response requirement are mapped into the FCP controller 50. In most embodiments the FCP controller could be implemented using a low cost general-purpose processor, such as any of the commodity microprocessors that are commercially available.

Figure 3:
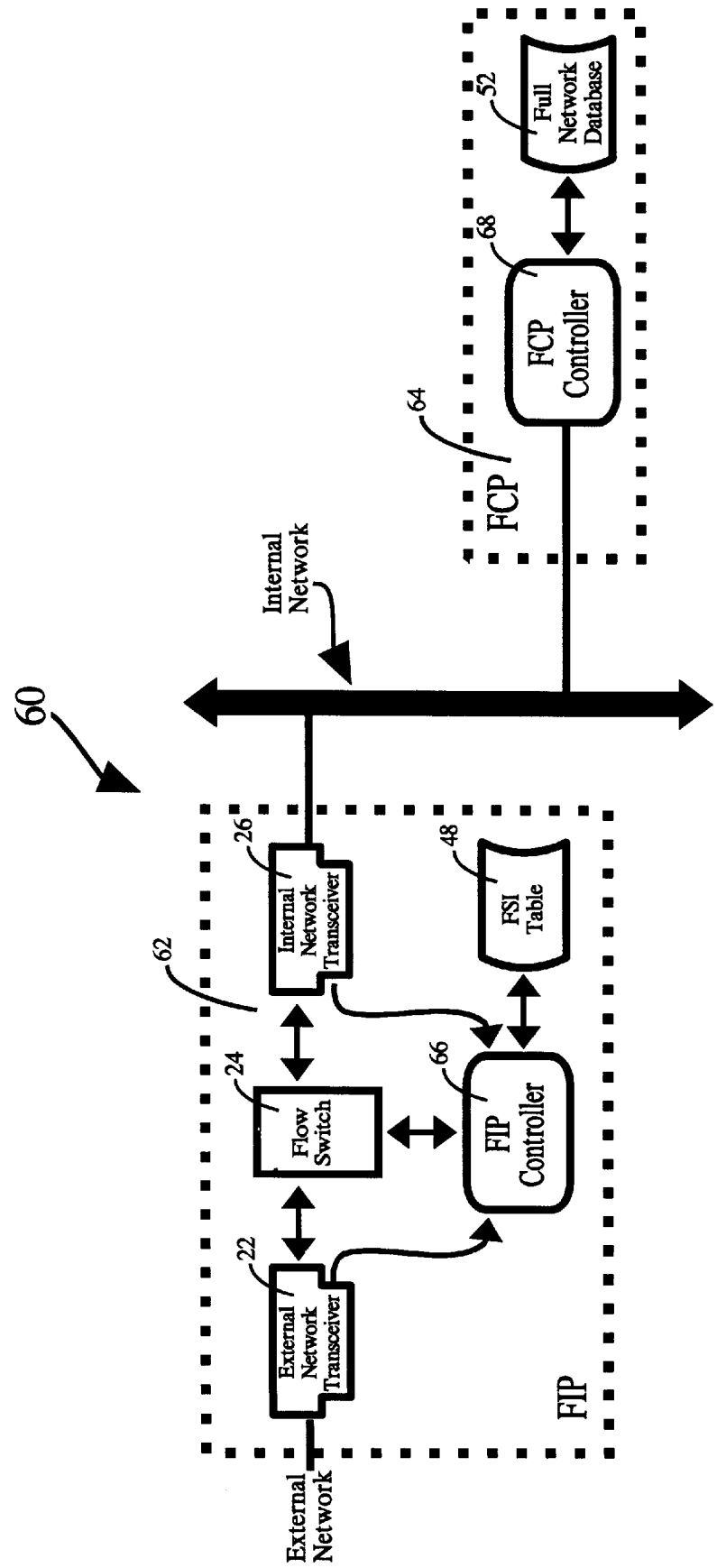
FIG. 3 is a schematic drawing of another preferred embodiment of the present invention which depicts the geographic separation of the Firewall Control Processor, the Firewall Inline Processor, other related functions, and the communication between the two functional entities through cell tunneling.

The FCP controller 50 and the full network database 52, together denoted as the FCP 44, do not have to be co-located with the FIP 42. In an intra-network addressable (INA) hierarchical firewall 60, as shown in FIG. 3, the INA FIP 62 is located at the boundary between the internal and external network and the INA FCP 64 is located within the internal network. The INA FCP 64 can be located anywhere on the internal or external networks, but as a practical security matter would generally be located in the protected enclave of the internal network in this alternate embodiment.

Figure 2:
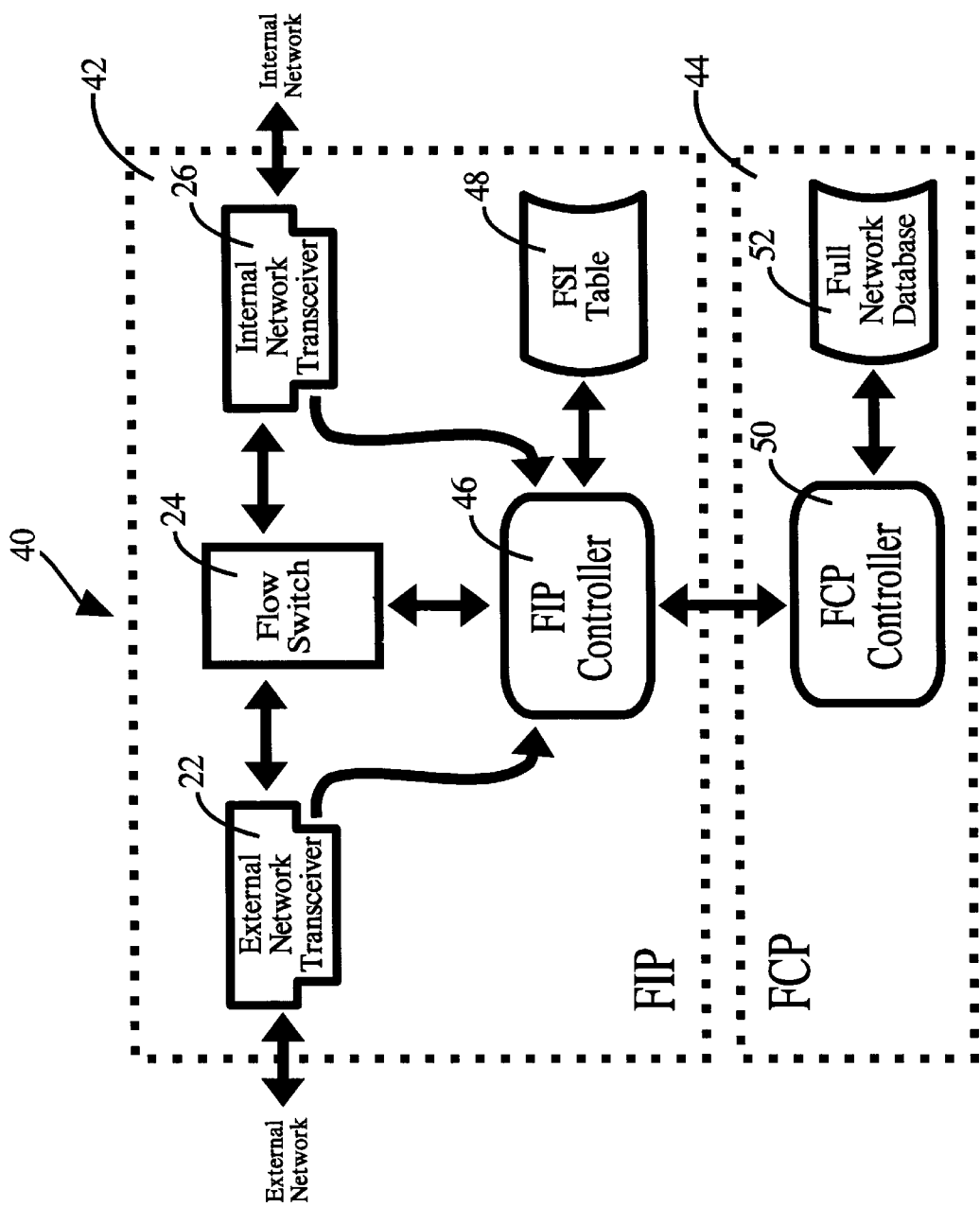
FIG. 2 is a schematic drawing of another preferred embodiment of the present invention which depicts the active connection management processing and other related functions described above, and the low level cell examination deployed in separate functional entities.

The communication link between the FCP 44 and the FIP 42 of the hierarchical firewall 40 in FIG. 2, or more specifically the FCP controller 50 and the FIP controller 46, is such that both elements can be contained within the same physical packaging, reside in separate physical packages and communicate through a direct link, or not be co-located at all as shown in the intra-network addressable (INA) hierarchical firewall 60 alternate embodiment configuration of FIG. 3. In this case, the INA FCP 64 could reside at some internal endpoint with communication between the INA FCP 64 and the INA FIP 66 supported through tunneling via the internal network transceiver 26 (or external network transceiver 22 should a requirement exist for such an embodiment with the INA FCP located on the external network, e.g., an external service provider providing INA hierarchical firewall 60 maintenance).

With the exception of the differing communications schemes between the FIP controller 46 and FCP controller 50 and between the INA FIP controller 66 and INA FCP controller 68, all other operations are the same for the INA hierarchical firewall 60 as for the hierarchical firewall 40. The following hierarchical firewall 40 discussion apply to the INA hierarchical firewall unless noted.

Security in the hierarchical firewall 40 is centered around the full network database 52 that lists all of the network hosts, both internal and external, that are allowed to communicate through the hierarchical firewall 40 and the FIP 42 FSI table 48 that lists all of the edge level identifiers associated with approved flows currently passing through the hierarchical firewall 40. The full network database also keeps a log of allowed and disallowed connection attempts.

When the hierarchical firewall 40 is initially activated, the FIP controller 46 clears all entries in the FSI table 48. In steady state operation, the FIP controller 46 monitors and reacts to the arrival of PDUs on its external 22 and internal 26 network transceivers. Commands arrive from the FCP controller 50 for the FIP controller 46 to execute. Typically, these commands instruct the FIP controller 46 to add or drop entries from its FSI table 48. The FCP controller 50 can also command the FIP controller 46 to completely reset the contents of the FSI table 48. Whenever a PDU arrives on either the external 22 or internal 26 network transceiver, the FIP controller 46 uses the PDU edge information of the arriving PDU as an index into the FSI table 48. The FIP controller 46 uses the data stored at this FSI table 48 index to determine if it should allow the PDU to continue along the inline link, pass the PDU to the FCP controller 50, or drop the PDU from traversing the flow switch 24.

The FCP 44 provides the security aspect to the hierarchical firewall 40 by assigning the paths used to route traffic through the FIP 42. Upon initialization, the FIP 42 blocks all traffic to the external 22 and internal 26 network transceivers because all of its FSI table 48 entries are empty. The FCP 44 initiates its firewall functions by commanding the FIP 42 to add the signaling channels to the FSI table 48 based on a priori knowledge. In ATM, the identity of the signaling channel is determined by the version of the software, such as SPANS or UNI running on the ATM switches attached to the hierarchical firewall 40. After receiving this FCP command, the signaling traffic is allowed through the FIP 42. A copy of the signaling traffic is sent to the FCP controller 50 so that the FCP controller 50 can determine its suitability.

The FCP controller 50 inspects the signaling messages passed to it by the FIP 42. The FCP controller 50 determines whether or not to allow a connection based on an active connection management determination. In the case where the connection is allowed, the FIP 42 is sent a command specifying the approved link level identifiers of that flow. The FIP controller 46 receives the message and records the approved link level identifiers in the FSI table 48 to allow traffic on the particular edge. PDUs on this edge continue to pass until the connection is released. When the connection is released, the FCP controller 50 commands the FIP 42 to disallow further traffic on the negotiated edge. Disallowing traffic of a specific flow is achieved by the FIP controller 46 removing the entry of the associated link level identifiers from the FSI table 48.

If the connection is not allowed, no action need be taken because the FIP 42 drops any traffic flow that is not explicitly added to the FSI table 48 by the FCP 44. The connections eventually will time-out since its PDUs will be dropped by the hierarchical firewall 40. Alternately, to expedite the closure of a blocked connection, a signaling message can be sent to the source and destination endpoints instructing them to release the connection. This will free the dangling resources used at the endpoints of the flow.

The FCP controller 50 continually examines all of the signaling PDUs passing through the inline link and commands the FIP 42 to modify its FSI table 48 in reaction to the creation and deletion of flows on the link. The FIP 42, in turn, continues to compare the link level identifiers of all incoming PDUs to the list of approved link level identifiers in the FSI table 48. The FIP 42 drops any PDUs that do not belong to a registered link level identifier.

In some embodiments, the full network database 52 may actually be composed of multiple databases. Typical examples would be the Access Control List Database (ACLD), the Open Connection List Database (OCLD), and the Connection Event Logging Database (CELD). Of these three examples, only the CELD is a database in the true sense. The ACLD and the OCLD are internal structures used to store information regarding the current state of the hierarchical firewall 40.

An ACLD may contain two lists, one for outbound and one for inbound traffic, that contain the endpoint identifier filtering rules used to determine whether an incoming or outgoing connection should be allowed to proceed. The two ACLD lists could be combined into a single list, but processing is accelerated with the configuration described above. The end point identifiers can be specified explicitly or with wild-cards and, in either case, can make use of ranges. Typical ACLD fields include the entry type, address type, source and destination addresses with optional range addresses, and the action to be taken. The entry type field tells the control process whether the source and/or destination addresses are specified as ranges. The action field specifies the action to be taken if a given connection request matches the criteria of a particular rule. There are four possible actions: permit, deny, monitor incoming, and monitor outgoing. This action field is used to initialize the handling code, which is transmitted to the FIP controller 46 in the payload of a command message. The handling code is stored within the FSI table 48 by the hardware and is used by the FIP controller.

An OCLD stores information about all active connections passing through the hierarchical firewall 40. For each active connection, the following information is stored: the Call Reference Value (CRV), the current state of the connection (i.e. setup, connect etc.), source and destination endpoint identifiers, address types, connection origin, the time of the receipt of the Setup, Connect, and Release messages, AAL PDU type, edge level identifiers of the incoming and outgoing connection, quality of service information, and the handling code. Note that the edge level identifiers are stored for each direction.

A CELD may function as the master logging database of the system. All connection related information could be stored within it. This information can be stored so that a detailed picture of the connection activity to a site, both allowed and disallowed, can be created and analyzed. The goal of this analysis is to spot trends or other evidence that would indicate suspicious activity.

A key element that allows the hierarchical firewall 40 to operate with minimum performance degradation is the FSI table 48 that determines what action should be taken for a PDU received on a given edge. The serial inline elements, external 22 and internal 26 network transceivers and the flow switch 24 all operate at line speed. Only the FIP controller 46 and its inquiries of the FSI table 48 potentially slow down an approved flow. Therefore, high-speed operation of the FSI table 48 is essential for the hierarchical firewall 40 to maintain optimum performance.

A two level hierarchical look up table algorithm is used to store and look up entries in the FSI table 48. The utility of this implementation depends on the fact that the total number of active connections is much smaller than the total address space for connections. This assumption is true for most circuit switched networks. The addition and deletion of entries to the table is directed by commands from the FCP 50. Approved flows are added by updating the entries in the FSI table 48.

Some embodiments of the present invention may use a hashing method, described below, that has the ability to collapse the extremely large address space of the FSI table 48 onto a much smaller space. The smaller space is arranged so that an entry can be located quickly, even if there were collisions in the hashing (two items mapping to the same location in the smaller space). The hashing algorithm used with this invention uses characteristics of the address space allocation for improved access speed. In the example below, the characteristics of ATM address space allocation are used.

In the tiered hashing algorithm, the first stage of the hash function maps every link level identifier into a smaller memory space. Because every link level identifier maps to one location in this smaller space, several link level identifiers map to the same location in the smaller space. In order to resolve between these hash collisions, several subfields are contained at each hash entry. These subfields contain the complete link level identifier address for the entry specified by that subfield, and they contain information concerning how this entry should be handled by the firewall. By using this multi-level hash algorithm, the memory requirements of FSI table 48 can be dramatically reduced.

The performance of this algorithm relies on the fact that the complete link level information is used to immediately narrow down the space that has to be checked to determine the appropriate manner to for handling newly arriving cells on that edge. This initial check is followed by a secondary test that specifically identifies the flow handling information. The parameters concerning how many entries there should be in the hash table and how many subfields are required for each entry depend on the size of the edge level identifier field and amount of traffic on the network.

An example for how this hashing algorithm could be implemented in ATM networks is provided in the following paragraphs. The link level identifier associated with an ATM flow passing through the firewall consists of a 12-bit VPI, a 16-bit VCI, and a 1-bit direction identifier that denotes whether the flow is being transmitted to the internal or external network. In the highest speed implementation, the 29 bits of information that uniquely identify the flow could be used to address a memory table that holds a two-bit value that specifies whether or not the cell on that flow should be forwarded through the firewall, passed to the FCP 44, or both forwarded and passed to the FCP 44. Although this implementation requires only one memory lookup to determine how to handle a flow, and is thus very fast, it also requires over one gigabit of memory to implement. Thus, this solution is cost prohibitive.

In the example tiered ATM hashing approach, the 29 bits of edge level information are hashed into a 17-bit value. The equation used to produce the 17-bit hash address is:

H(16)="1" for incoming flows, "0" for outgoing flows
H(i)=VCI(i), for $12 \leq i \leq 15$
H(i)=VCI(i) $\otimes$ VPI(11−i), for $0 \leq i \leq 11$ where H(J) is bit "j" of the hash, VCI(i) is bit "i" of the VCI, and VPI(K) is bit "k" of the VPI.

In an embodiment using this ATM example hashing approach, this 17-bit value could be used to address one of the entries in the FSI table 48. Each entry in the table, in turn, contains eight 30-bit subfields. Twenty-eight bits of the subfield are used to hold the full VPI and VCI of the flow being referenced. The other two bits of the subfield hold information concerning whether the cells in the flow should be passed through the hierarchical firewall 40 or to the FCP 44.

This approach requires eight memory lookups instead of one, but this is still a relatively small number of lookups per flow, and it is suitable for real-time performance. This approach only supports up to eight flows that hash to the same address but due to the large address space in ATM, and due to the relatively small number of connections that are open at any given moment, it is not expected that this constraint will been encountered in real networks.

The primary advantage of this method is that it requires only four megabits of memory to implement. This equates to substantial cost savings over the full edge-space implementation, and it is the key to enabling this technology to be widely deployed in large networks.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A firewall security apparatus for high-speed circuit switched networks deployed between an external circuit switched network and an internal circuit switched network for preventing unauthorized communications between the external and internal circuit switched networks, while permitting authorized communications, comprising:

an external network transceiver having means for receiving incoming protocol data units (PDUs) from the external circuit switched network and transforming the physical line characteristics of the PDUs on the external circuit switched network media to a digital bit stream protocol data units and having means for receiving digital bit stream PDUs, transforming the received digital bit stream PDUs to the physical line characteristics of the external circuit switched network media, and transmitting the PDUs on the external circuit switched network;

an internal network transceiver having means for receiving incoming PDUs from the internal circuit switched network and transforming the physical line characteristics of the PDUs on the internal circuit switched network media to a digital bit stream PDUs and having means for receiving digital bit stream PDUs, transforming the received digital bit stream PDUs to the physical line characteristics of the internal circuit switched network media, and transmitting the PDUs on the internal circuit switched network;

a flow switch for switching the communications between the external and internal circuit switched networks on command, connected in series between said external network transceiver and said internal network transceiver, and having means for receiving commands, having means for receiving digital bit stream PDUs from said external network transceiver, causing the digital bit stream PDUs received from said external network transceiver to be transmitted to said internal network transceiver, and causing said internal network transceiver to transform the digital bit stream PDUs received from said external network transceiver to the physical line characteristics of the internal circuit switched network media and to transmit them on the internal circuit switch network on command and having means for receiving digital bit stream PDUs from said internal network transceiver, causing the digital bit stream PDUs received from said internal network transceiver to be transmitted to said external network transceiver, and causing said external network transceiver to transform the digital bit stream PDUs received from said internal network transceiver to the physical line characteristics of the external circuit switched network media and to transmit them on the external circuit switch network on command;

a firewall database for storing a list of all approved external circuit switched network and internal circuit switched network approved link level identifiers and endpoints and a list of link level identifiers identified as containing signalling messages and control information; and a firewall controller for controlling communications between the external and internal circuit switched networks, having a set of active connection management rules for determining under what circumstances communications between the external and internal circuit switched networks are authorized;

having means for receiving the digital bit stream PDUs from said external network transceiver and said internal network transceiver;

having means for determining if the digital bit stream PDU received is control information, commanding said flow switch to transmit the digital bit stream PDU to the external circuit switched network for digital bit stream PDUs received from the internal circuit switched network and to the internal circuit switched network for digital bit stream PDUs received from the external circuit switched network, processing the control information to obtain routing and configuration information, and writing the routing and the configuration information to said firewall database, when the digital bit stream PDU is control information;

having means for determining if the digital bit stream PDU received is part of a signaling message, reassembling the signaling message, determining if the signaling message is a connection request signaling message, determining if the signaling message is a connection deletion signaling message, commanding said flow switch to transmit the digital bit stream PDU to the external circuit switched network for digital bit stream PDUs received from the internal circuit switched network and to the internal circuit switched network for digital bit stream PDUs received from the external circuit switched network when the digital bit stream PDU is a signaling message, removing the entry from the list of all approved external circuit switched network and internal circuit switched network approved link level identifiers and endpoints in said firewall database associated with the connection deletion signaling messages when the digital bit stream is a connection deletion signaling message, and adding a link level identifier entry to the list of all approved external circuit switched network and internal circuit switched network approved link level identifiers and endpoints in said firewall database associated with the connection request signaling messages when the link level identifier is authorized under said set of active connection management rules, when the digital bit stream PDU is a connection request signaling message; and having means for determining if the digital bit stream PDU received is data, determining if the digital bit stream PDU is listed as approved in said firewall database, and commanding said flow switch to transmit the digital bit stream PDU to the external circuit switched network for digital bit stream PDUs received from the internal circuit switched network and to the internal circuit switched network for digital bit stream PDUs received from the external circuit switched network when the digital bit stream PDU is listed as approved in said firewall database.

2. A firewall security apparatus for high-speed circuit switched networks according to claim 1, wherein said set of active connection management rules further comprise a participant verification means whereby the determination as to whether a communication between the external and internal circuit switched networks is authorized is accomplished by examination of the endpoint identifiers within the connection request signaling message.

3. A firewall security apparatus for high-speed circuit switched networks according to claim 1, wherein said set of active connection management rules further comprise a route validation means whereby the determination as to whether a communication between the external and internal circuit switched networks is authorized is accomplished by examination of the path used to set up the connection, and the consistency of the path with respect to the endpoints identifiers within the connection request signaling message.

4. A firewall security apparatus for high-speed circuit switched networks according to claim 1, wherein said set of active connection management rules further comprise an endpoint authentication means whereby the determination as to whether a communication between the external and internal circuit switched networks is authorized is accomplished by verification of the authenticity of the participants identified for the connection.

5. A firewall security apparatus for high-speed circuit switched networks according to claim 4, wherein said set of active connection management rules further comprise an endpoint authentication means between the external endpoint and said firewall security apparatus for high-speed circuit switched networks whereby the determination as to whether a communication between the external endpoint and said firewall security apparatus for high-speed circuit switched networks is authorized is accomplished by verification of the authenticity of the participant identified for the external connection.

6. A firewall security apparatus for high-speed circuit switched networks according to claim 1, wherein said set of active connection management rules further comprise a resource allocation request authentication means whereby the determination as to whether a communication between the external and internal circuit switched networks is authorized is accomplished by detecting abnormalities in internal circuit switch network resource requests, multiple connection requests from the same endpoint, and excessive quality of service requests that would lead to monopolization of internal circuit switched network resources.

7. A firewall security apparatus for high-speed circuit switched networks according to claim 1, wherein said set of active connection management rules further comprise a plurality of separate authentication processes for classes of users and individual user participants on the external and internal circuit switched networks whereby the determination as to whether a communication between the external and internal circuit switched networks is authorized is accomplished.

8. A firewall security apparatus for high-speed circuit switched networks according to claim 1, wherein said means for determining if the digital bit stream PDU received is control information further comprises a means for causing said firewall database to log the control information digital bit stream PDUs received.

9. A firewall security apparatus for high-speed circuit switched networks according to claim 1, wherein:
    said set of active connection management rules further comprise a means for determining if the digital bit stream PDU is listed as conditionally approved in said firewall database,
    said firewall database further comprises a list of all conditionally approved link level identifiers and endpoints, and
    said means for determining if the digital bit stream PDU received is part of a signaling message further comprises means for removing the entry from the list of all conditionally approved external circuit switched network and internal circuit switched network approved link level identifiers and endpoints in said firewall database associated with the connection deletion signaling messages when the digital bit stream is a connection deletion signaling message, and adding an link level identifier entry to the list of all conditionally approved external circuit switched network and internal circuit switched network approved link level identifiers and endpoints in said firewall database associated with the connection request signaling messages when the link level identifier is authorized under said set of active connection management rules, when the digital bit stream PDU is a connection request signaling message.

10. A firewall security apparatus for high-speed circuit switched networks according to claim 1, wherein said firewall controller for controlling communications between external and internal circuit switched networks further comprises a means for examining control information for hidden functionality when the digital bit stream PDU received is control information.

11. A firewall security apparatus for high-speed circuit switched networks according to claim 1, wherein said means for determining if the digital bit stream PDU received is data message further comprises a means for sending a signaling message to the digital bit stream PDU source and destination endpoints instructing the source and destination endpoints to release the connection when the digital bit stream PDU is not listed as approved in said firewall database.

12. A firewall security apparatus for high-speed circuit switched networks according to claim 1, wherein said list of all approved external circuit switched network and internal circuit switched network approved link level identifiers and endpoints is mapped to a smaller memory space through a hash function.

13. A firewall security apparatus for high-speed circuit switched networks according to claim 12, further comprised of means for resolving hash collisions in said list of all approved external circuit switched network and internal circuit switched network approved link level identifiers and endpoints.

14. A firewall security apparatus for high-speed circuit switched networks according to claim 1, further comprising:
    a separate firewall control processor for supporting the non-line-speed functions of the firewall security apparatus for high-speed circuit switched networks, comprising:
        said set of active connection management rules,
        said means for processing the control information to obtain routing and configuration information,
        said means for writing the routing and the configuration information to said firewall database, and said means for reassembling the signaling message,
        said means for determining if the signaling message is a connection request signaling message,
        said means for determining if the signaling message is a connection deletion signaling message, and
        said means for removing and adding a link level identifier entry to the list of all approved external circuit switched network and internal circuit switched network approved link level identifiers and endpoints;

and further comprising:
- a full network database, for supporting the non-line-speed functions of the firewall security apparatus for high-speed circuit switched networks,
- a firewall control processor controller, for controlling non-line-speed functions of said firewall security apparatus for high-speed circuit switched networks, and
- a means for communicating between said full network database and said firewall control processor controller; and a separate firewall inline processor comprising all the remaining components of said firewall security apparatus for high-speed circuit switched networks for accomplishing those functions of said firewall security apparatus for high-speed circuit switched networks that need to operate at line-speed, and further comprising a means for communicating with said firewall control processor.

15. A firewall security apparatus for high-speed circuit switched networks according to claim 14, wherein said firewall control processor is located on the internal circuit switched network and said means for communicating with said firewall control processor further comprise tunneling via said internal network transceiver.

16. A firewall security apparatus for high-speed circuit switched networks according to claim 14, wherein said firewall control processor is located on the external circuit switched network and said means for communicating with said firewall control processor further comprise tunneling via said external network transceiver.

* * * * *